(12) United States Patent
Song et al.

(10) Patent No.: US 8,112,261 B2
(45) Date of Patent: Feb. 7, 2012

(54) METHODS AND SIMULATION TOOLS FOR PREDICTING GPS PERFORMANCE IN THE BROAD OPERATING ENVIRONMENT

(75) Inventors: Hyok J. Song, Camarillo, CA (US); Hui-Pin Hsu, Northridge, CA (US); Eray Yasan, Canton, MI (US); Richard W. Wiese, Highland, MI (US)

(73) Assignee: GM Global Technology Operations, LLC., Detroit, MI (US)

( * ) Notice: Subject to any disclaimer, the term of this patent is extended or adjusted under 35 U.S.C. 154(b) by 880 days.

(21) Appl. No.: 12/059,853

(22) Filed: Mar. 31, 2008

(65) Prior Publication Data

US 2009/0243914 A1    Oct. 1, 2009

(51) Int. Cl.
*G06F 17/50* (2006.01)
(52) U.S. Cl. ........ 703/13; 342/360; 455/456.1; 370/320
(58) Field of Classification Search .............. 703/2, 13; 342/169, 357.64, 360; 701/213; 455/456.1, 455/446, 12.1, 13.1, 427; 370/320, 324
See application file for complete search history.

(56) References Cited

U.S. PATENT DOCUMENTS

| | | | | |
|---|---|---|---|---|
| 6,317,599 B1 * | 11/2001 | Rappaport et al. | ............ | 455/446 |
| 6,442,480 B1 * | 8/2002 | Takahashi | ..................... | 701/213 |
| 6,862,269 B1 * | 3/2005 | Nasta | ............................. | 370/320 |
| 7,035,642 B2 * | 4/2006 | Rappaport et al. | ............ | 455/446 |
| 7,440,427 B1 * | 10/2008 | Katz | ............................... | 370/321 |
| 7,454,202 B2 * | 11/2008 | de La Chapelle | ............. | 455/427 |
| 2002/0142781 A1 * | 10/2002 | Wiedeman et al. | ........... | 455/456 |
| 2007/0178833 A1 * | 8/2007 | Wahlberg et al. | ............ | 455/12.1 |

OTHER PUBLICATIONS

Telli et al., Link Analysis for BILSAT-1, IEEE Aerospace Conference, 2006, pp. 1-6.*
Caini et al., Satellite Diversity in Mobile Satellite CDMA Systems, IEEE Journal on Slected Areas in Communications, Jul. 2001, pp. 1324-1333.*
Debono et al, Optimization of the UMTS Network Radio Coverage On-Board an Aircraft, IEEE, Aerospace Conference, 2008, pp. 1-7.*

* cited by examiner

*Primary Examiner* — Russell Frejd
(74) *Attorney, Agent, or Firm* — Leydig, Voit & Mayer, Ltd.

(57) ABSTRACT

To facilitate GPS hardware selection and evaluate performance of vehicle integrated GPS hardware, including various types of GPS antennas and receivers, within different vehicle operating environments, embodiments of the invention are used to provide a simulator which does not require physical GPS hardware to simulate GPS system performance. Preferably, the simulator randomly generates one or more GPS system link budget variables, within predetermined performance bounds, in order to predict GPS system performance in a specific vehicle operating environment for a given antenna radiation pattern and/or GPS receiver. The simulator employs a Monte Carlo technique to evaluate the GPS system performance based on generated pools of link budget variables.

18 Claims, 4 Drawing Sheets

METHODS AND SIMULATION TOOLS FOR PREDICTING GPS PERFORMANCE IN THE BROAD OPERATING ENVIRONMENT

FIELD OF THE INVENTION

This invention relates generally to the field of telematics and more specifically to the field of computer-aided prediction of anticipated performance of mobile GPS systems.

BACKGROUND OF THE INVENTION

Modern automobile design includes integration of various types of satellite service equipment, such as Global Positioning System (GPS) equipment, into vehicle hardware. Since GPS hardware characteristics, such as GPS receiver sensitivity and GPS antenna radiation patterns, vary across manufacturers and equipment models, the effect of new GPS hardware on GPS receiver performance is frequently tested via GPS signal simulators prior to acceptance of new equipment.

However, GPS signal simulators, such as those manufactured by Spirent, predict the effect of emulated GPS signals and GPS satellite constellations by connecting a physical (i.e., hardware) GPS test receiver to the signal emulator, thereby increasing cost and reducing versatility. Furthermore, GPS signal performance depends heavily on a specific GPS antenna in use and on the type of vehicle operating environment. For example, a specific antenna radiation pattern, as well as the type, height and location of buildings, trees, and other factors affecting propagation conditions in a particular locale, impact GPS receiver performance. Hardware based GPS simulators require a user to specify a straight drive route with specific buildings of certain heights and attenuation attributes in an attempt to take into account a user-specific operating environment. However, this method of including environmental effects into a simulation scenario is very time consuming, only covers limited user specific scenarios, and does not take into account changes in GPS antenna gain with respect to a given satellite in view due to sharp vehicle turns. Hence, hardware based simulators may require the user to manually create hundreds or thousands of different simulation scenarios to cover drive routes and local environment effects to account for many possible GPS signal propagation conditions in a typical vehicle operating environment (e.g., open sky, urban, suburban, etc). Another way of taking into account environmental effects includes field data collection campaigns where GPS signal data is collected from an actual vehicle traveling along a specified drive route to model a typical vehicle operating environment and/or effects of a given GPS antenna. However, such measurement campaigns are both equipment and labor intensive. Furthermore, field measurement data from one city may not equally apply to predicting GPS receiver performance in another city with different environmental factors, such as different foliage and building types.

Therefore, a need exists for a software based GPS system simulator that predicts the effect of various GPS hardware characteristics, such as specific GPS antenna patterns, without requiring a connection to GPS hardware or field measurement campaigns to take into account a wide variety of vehicle operating environments.

BRIEF SUMMARY OF THE INVENTION

To facilitate GPS hardware selection and evaluate the performance of vehicle integrated GPS hardware, including various types of GPS antennas and receivers, within different vehicle operating environments, a simulator is provided which does not require physical GPS hardware to simulate GPS system performance. Preferably, the simulator randomly generates one or more GPS system link budget variables, within predetermined performance bounds, in order to predict GPS system performance in a specific vehicle operating environment for a given antenna radiation pattern and/or GPS receiver. The simulator employs a Monte Carlo technique to evaluate the GPS system performance based on generated pools of link budget variables.

In one aspect of the invention, a satellite coverage simulator is provided comprising (a) a random number generator for generating a predetermined number of values for one or more variables corresponding to a satellite coverage link budget, the predetermined number of values generated for each one of a plurality of satellites in one or more satellite constellations available for a satellite receiving unit for a predetermined time period, (b) a satellite antenna radiation pattern comprising a digitized representation of satellite antenna gain associated with the satellite receiving unit, and (c) an evaluation module for evaluating the satellite coverage link budget via a Monte Carlo technique based on each one of the predetermined number of values and the satellite antenna radiation pattern.

DESCRIPTION OF AN EXEMPLARY EMBODIMENT

Figure 1:
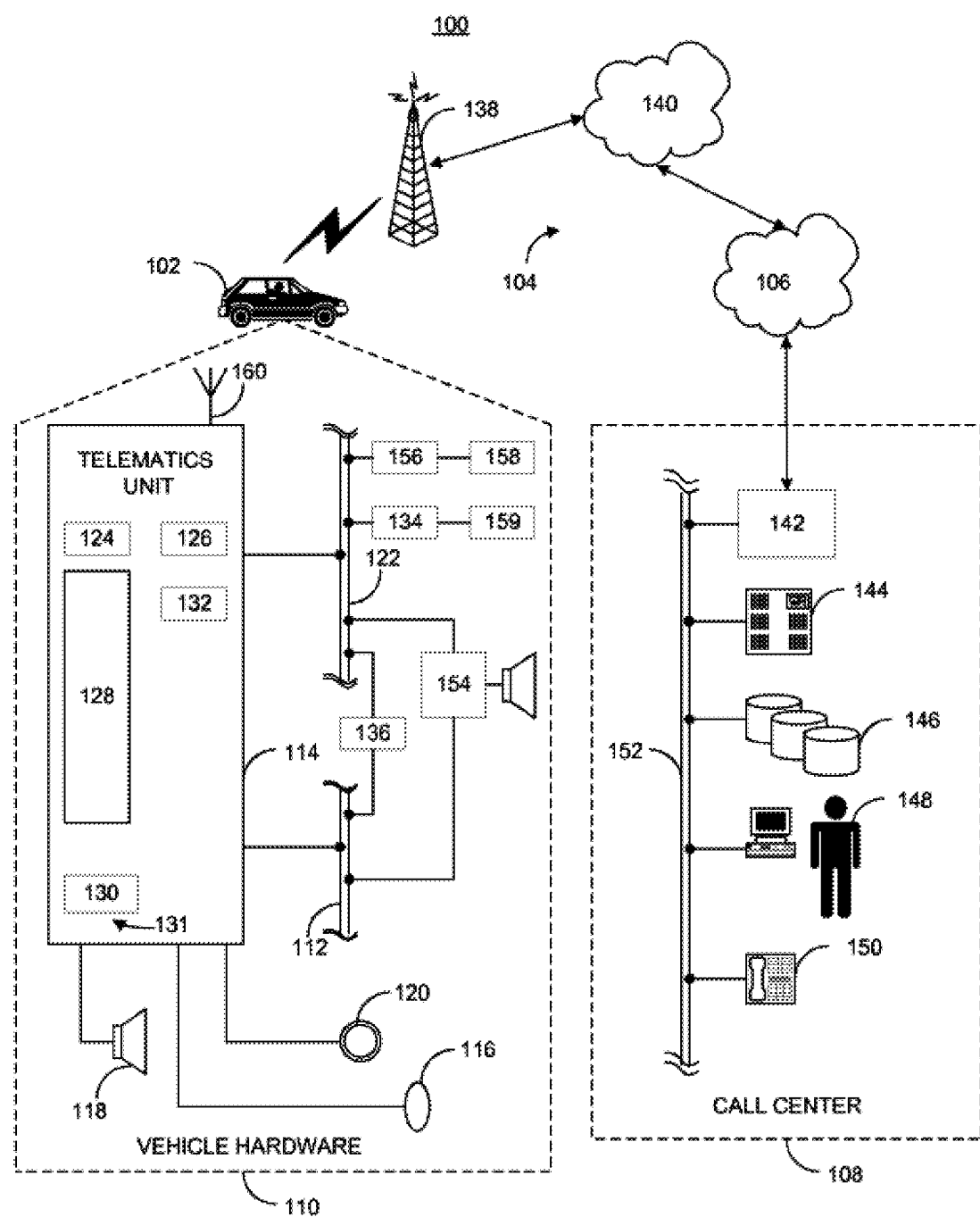
FIG. 1 is a schematic diagram illustrating a system for delivery of in-vehicle telematics services, as contemplated by an example of the present invention.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100, however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128, one or more types of electronic memory 130 having stored thereon software 131, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push-button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 159, connected to various sensor interface modules 134 are operatively connected to the vehicle bus 122. Examples of vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
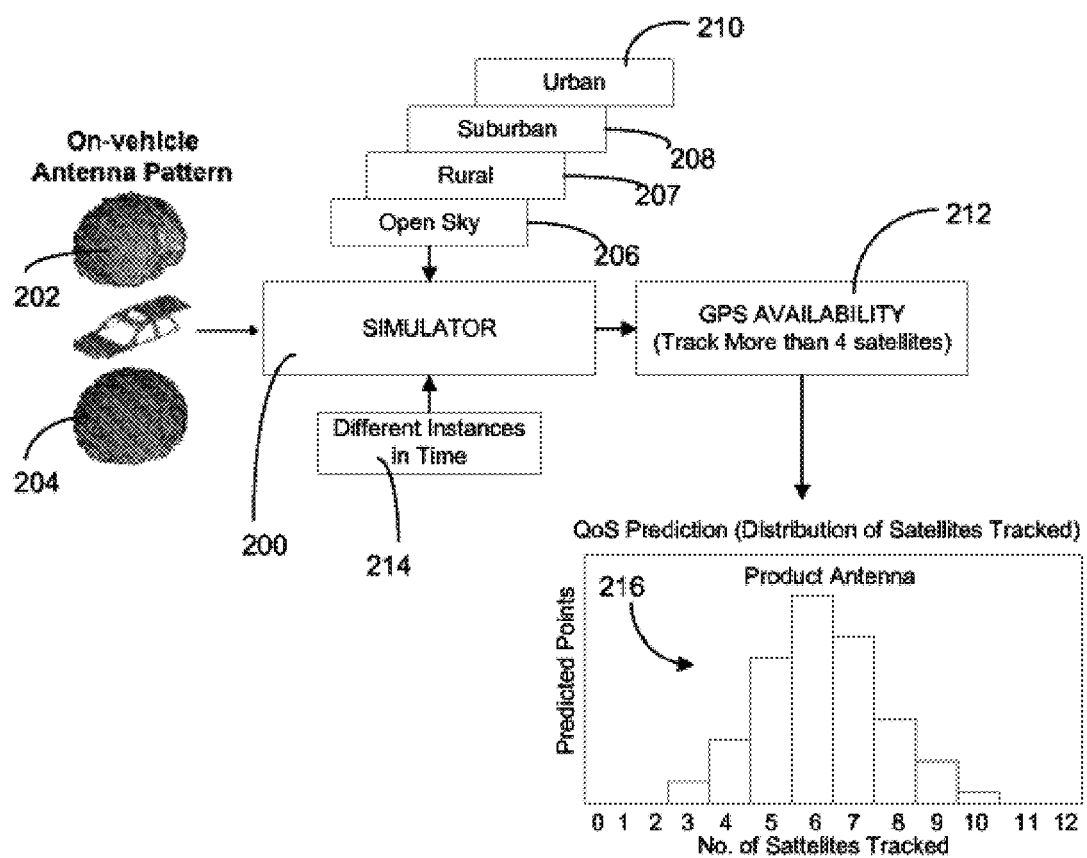
FIG. 2 is a schematic diagram of a GPS simulator for predicting GPS system performance based on various GPS hardware parameters, including GPS antenna radiation patterns, and various vehicle operating environments, in accordance with an example of the invention.

To facilitate GPS hardware selection and evaluate the performance of vehicle integrated GPS hardware, including various types of GPS chipset 132 and/or dual antenna 160, within different vehicle operating environments, a simulator is provided which does not require physical GPS hardware to simulate GPS system performance. Turning to FIG. 2, the simulator 200 comprises a computer system including computer executable instructions stored on a computer readable medium, such as a hard drive, flash memory, magnetic or optical medium, or the like for predicting GPS system performance based on various GPS hardware parameters of the vehicle telematics unit 114, GPS antenna patterns associated with different dual antennas 160, and various vehicle operating environments 206-210. In one example, the antenna 160 is a dual antenna incorporating a GPS antenna and a satellite radio antenna in a single enclosure. In another example, antenna 160 is a dedicated GPS antenna.

The simulator 200 accepts input of GPS-antenna radiation patterns 202, 204, which represent digitized representations of antenna gain along a given azimuth in 360 degree vertical and horizontal directions. The simulator 200 further accepts input of various radio frequency (RF) propagation parameters specific to an open sky vehicle operating environment 206, a rural vehicle operating environment, 207, a suburban vehicle operating environment 208, and an urban vehicle operating environment 210 to estimate GPS signal availability status 212 to the vehicle 102. By simulating a variety of vehicle operating environments 206-210 and accepting input relating to characteristics of various GPS hardware, the simulator 200 foregoes the need for using actual GPS equipment (such as a GPS receiver and/or a GPS antenna) to collect received GPS signal data along multiple drive routes and simulates GPS system performance in a variety of operating environments.

Figure 2A:
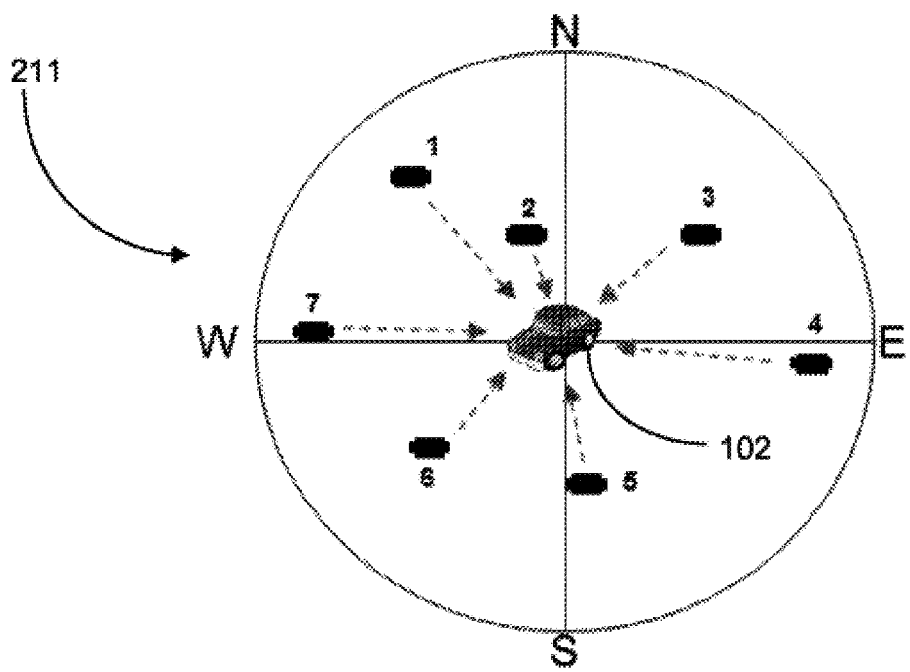
FIG. 2A is a schematic diagram of one of a plurality of satellite constellations visible to the vehicle of FIG. 1 during different instances of time within a twenty four hour period, in accordance with an example of the invention.

Since a maximum number of satellites available for the vehicle 102 in a given geographic location changes throughout the day due to earth's rotation, simulator 102 takes into account multiple satellite constellations 211 (FIG. 2A) visible to the vehicle 102 during different instances of time 214 within a twenty four (24) hour period. In the exemplary satellite constellation 211 of FIG. 2A, only satellites 1-7 are potentially visible to the vehicle 102 at a particular instance of time (if signal conditions are perfect). For a given vehicle operating environment 206-210, the simulator 200 preferably predicts GPS system performance in two hour increments where each time increment corresponds to a given satellite constellation. In another example, the simulator 200 accepts user input for specifying time increments for prediction of GPS system performance, where smaller time increments correspond to increased accuracy of prediction but result in increased prediction processing times.

In one example, the GPS signal is available when the GPS chipset 132 is able to track four or more satellites. As the number of tracked satellites increases, received GPS signal strength increases resulting in an increased probability of signal availability and quality of service ("QoS") for the GPS chipset 132. Therefore, in one example, the simulator 200 outputs a histogram 216 predicting the satellite signal availability and corresponding distribution of number of tracked satellites for a particular antenna 160 and/or GPS chipset 132 in a given operating environment 206-210. In the illustrated example, 97.8 percent of predicted points within a given operating environment are expected to have the satellite signal available (e.g., predicted points with four or more tracked satellites). In an example, the simulator 200 accepts user input for specifying the minimum number of satellites and corresponding received signal strength (RSSI) and/or carrier-to-noise ratio (CNR) for GPS signal availability. The simulator 200 also outputs a graphical representation of GPS system performance via color-coded RSSI, availability, QoS, and/or CNR plots for a plurality of geographic vehicle operating environments 206-210.

The simulator 200 randomly generates a plurality of variables in order to predict GPS system performance for a given antenna radiation pattern and/or GPS receiver/chipset 132. In an example, the simulator 200 also randomly generates a drive route within a given operating environment 206-210, along which to predict the GPS system performance. In another example, the simulator 200 accepts user input of a geographical area, such as a set of latitude/longitude coordinates, for predicting the GPS system performance within the user-defined area. Preferably, the simulator 200 employs a Monte Carlo technique to randomly generate and evaluate a plurality of variables affecting GPS system performance. Each of the randomly generated variables is generated within a predetermined performance bound that is typical for the associated operating environment 206-210 and GPS hardware specification.

Figure 3:
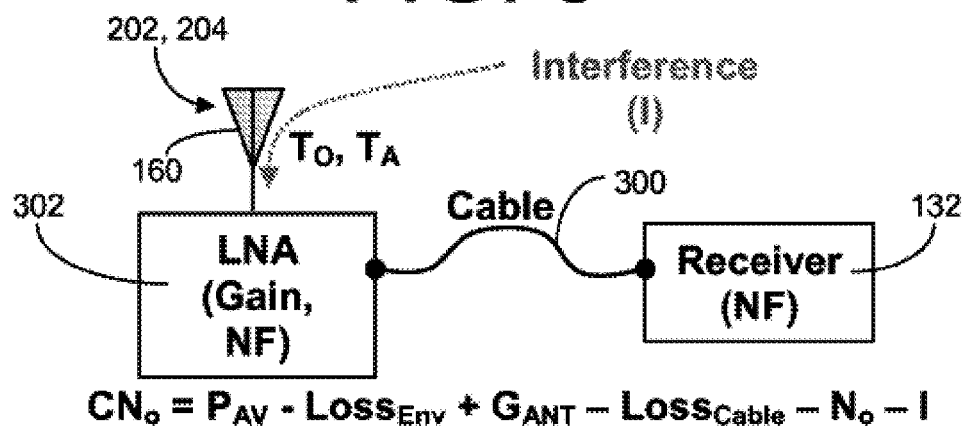
FIG. 3 is a schematic diagram of hardware and environmental components of a satellite system link budget employed by the simulator of FIG. 2, in accordance with an example of the invention.

Turning to FIG. 3, the simulator 200 employs a Monte-Carlo method to evaluate the satellite system link budget as a carrier-to-noise ratio (CNR) of received GPS signal. The CNR is expressed as $CN_0 = P_{av} - Loss_{env} + G_{ant} - Loss_{cable} - N_0 - I$. In the foregoing CNR equation, $P_{av}$ represents available GPS transmitted power on earth before attenuation due to trees and buildings, as guaranteed by the specifications issued by the U.S. Department of Defense. $Loss_{env}$ represents received GPS signal attenuation losses due to trees and buildings. $G_{ant}$ represents antenna gain of the GPS antenna 160 along a given azimuth in accordance with the loaded antenna radiation pattern 202, 204. $Loss_{cable}$ represents cable losses due to the cable 300 connecting the antenna 160 to the GPS receiver/chipset 132. When the GPS hardware includes a low noise amplifier (LNA) 302 at the output of the GPS antenna 160, the CNR equation further takes into account the gain and noise figure characteristics of the LNA 302. Furthermore, $N_0$ represents noise power, while I represents interference having components $T_0$ and $T_A$, which describe ambient and antenna noise temperatures, respectively.

The simulator 200 randomly generates values for one or more variables in the foregoing CNR equation within predetermined performance/range bounds to evaluate the equation via a Monte Carlo technique, which is a numerical integration method used for evaluating multi-variable (multi-dimensional) integrals. For example, the simulator 200 randomly assigns attenuation values for tree and building loss components of $Loss_{env}$. In an urban vehicle operating environment 210, the upper bound for the building loss component may be as high as 30 db due to the prevalence of large concrete buildings, while a typical building attenuation within a suburban vehicle operating environment is characterized by a lower building attenuation range. Similarly, a typical upper bound of attenuation due to trees may reach up to 10-11 db. In one example, the building and tree attenuation losses in an open sky vehicle operating environment are equal to zero. For a given satellite constellation potentially visible for the vehicle 102 at a particular instance of time, the performance of the GPS receiver 132 heavily depends on the characteristics of the vehicle operating environment in the direction of each satellite in view. For example, the GPS receiver 132 may see a given satellite in an unobstructed view (i.e., an open sky operating environment 206) at time t1 and receive an attenuated signal from the same satellite at another time t2 due to moving into a suburban or urban operating environment with various tree and building loss components and/or a change in the GPS antenna orientation and gain with respect to the satellite in view due to a sharp (e.g., ninety degree) turn of the vehicle 102.

Figure 4:
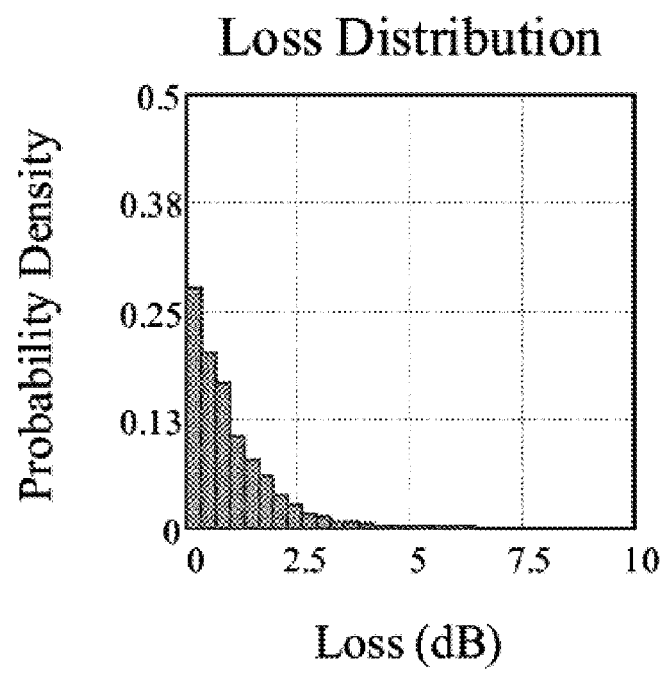
FIG. 4 is a schematic diagram of a beta distribution employed by the simulator of FIG. 2 to randomly generate attenuation values for a building blockage component of the satellite system link budget of FIG. 3 for a given vehicle operating environment, in accordance with an example of the invention.

The simulator 200 employs a random number generator to generate values for a given CNR variable for each satellite at a given time instance in accordance with a particular statistical distribution characteristic of such variable in a given vehicle operating environment. Preferably, the simulator 200 uses ten thousand (10,000) time instances/values for each satellite in view (in a given satellite constellation) to include comprehensive environmental effects in the simulation. For instance, when the vehicle 102 is in view of a satellite constellation 211 (FIG. 2A) having seven (7) satellites, the simulator 200 randomly assigns ten thousand attenuation values to one or more variables within the foregoing CNR equation for each of the satellites within the constellation 211. Therefore, in this example, each of the building and tree loss components of $Loss_{env}$ are randomly assigned seventy thousand (70,000) values within their respective statistical distributions specific to the vehicle operating environment that is subject to simulation. The random number generator draws the seventy thousand values from normal or beta distributions. For a suburban vehicle operating environment 208, for example, the simulator 200 employs a beta distribution of FIG. 4 with two real shape parameters of one (1) and ten (10) to generate attenuation values for building blockage component of $Loss_{env}$. At each instance of the simulation, each of the satellites in view within the constellation 211 is assigned an attenuation value for the building blockage loss from the pool of seventy thousand randomly generated building blockage values. Similarly, the simulator 200 assigns each of the satellites in view a tree attenuation value from another pool of randomly generated attenuations comprising tree attenuation values. Since hardware specifications, such as the amount of cable loss, antenna noise temperature, LNA gain, and LNA noise figure, may drift over time, in one example, the simulator 200 also accepts input of GPS hardware performance boundaries and corresponding statistical distributions for $Loss_{cable}$, $T_A$, LNA gain, and LNA noise figure parameters. In one example, the simulator 200 also randomly generates a pool of values to take into account fluctuations in the ambient noise temperature $T_0$, GPS satellite transmit power, as well as GPS antenna and GPS receiver connector and filter losses. The GPS antenna gain parameters are derived from the vehicle antenna patterns 202, 204 and remain constant (for a given antenna orientation) among the simulations. Alternatively, the simulator 200 employs static values for $Loss_{cable}$, $T_A$, $T_0$, LNA gain, and LNA noise figure parameters, while randomly generating building and tree loss components of $Loss_{env}$.

As the available satellite constellations (i.e., the number of satellites in view) change throughout the twenty four hour period of earth rotation, the simulator 200 randomly generates multiple pools of attenuation values for each of the building loss, tree loss, and, optionally, cable loss and ambient antenna temperature variables in the foregoing CNR equation, where the size of each pool of values correlates to the number of satellites in view. Upon randomly generating pools of attenuation values for one or more variables in the foregoing CNR equation, the simulator 200 evaluates the resulting CNR for each vehicle operating environment 206-210 using a Monte Carlo numerical integration approach.

In yet another example, the simulator 200 also accepts input of geographically coded terrain elevation values from a terrain database, as well as GPS antenna's 160 mounting height on the vehicle 102 for calculating the CNR and/or received signal strength (RSSI) values for each vehicle operating environment 206-210 via Monte Carlo integration. In an example, the simulator 200 is implemented as a set of computer executable instructions conforming to a MathCad® format and stored in computer readable medium, such as a hard drive, an optical disk, flesh memory, or the like.

Figure 5:
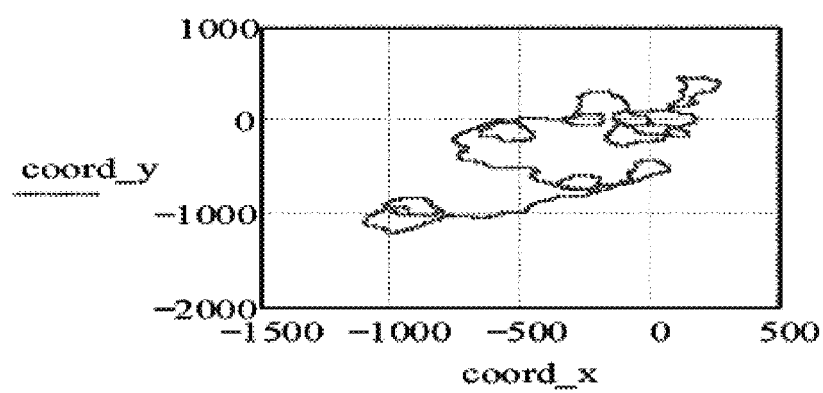
FIG. 5 is a schematic diagram of a drive route randomly generated by the simulator of FIG. 2, in accordance with an example of the invention.

Turning to FIG. 5, to simulate GPS signal reception along a plurality of roads, the simulator 200 randomly generates driving routes using digitized road map data for a particular geographic locale, such as all or part of a city or a geographic area corresponding to one or more vehicle operating environment 206-210. Alternatively or in addition, the simulator 200 accepts user input designating a geographic region for simulation of GPS system performance (e.g., via latitude/longitude boundary input, screen selection of road map data, or the like).

Those skilled in the art will appreciate that the simulator 200 is not limited to predicting GPS receiver performance. In one example, the simulator 200 is used for predicting performance of a satellite-based radio receiver. Additional examples include using the simulator 200 to predict performance of a wireless vehicle safety system, such as those employing radar and/or TPMS, including a vehicle-to-vehicle safety system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. In a computer system for evaluating performance of a satellite service, a non-transitory computer-readable medium having thereon computer-executable instructions for a satellite coverage simulator, the instructions comprising:
   instructions for implementing a random number generator for generating a predetermined number of values for one or more variables corresponding to a satellite coverage link budget, the predetermined number of values generated for each one of a plurality of satellites in one or more satellite constellations available for a satellite receiving unit for a predetermined time period, wherein the predetermined time period is less than or equal to two hours;
   instructions for generating a satellite antenna radiation pattern comprising a digitized representation of satellite antenna gain associated with the satellite receiving unit; and
   instructions for implementing an evaluation module for evaluating the satellite coverage link budget via a Monte Carlo technique based on each one of the predetermined number of values and the satellite antenna radiation pattern.

2. The computer-readable medium of claim 1 wherein the satellite service is a GPS service.

3. The computer-readable medium of claim 1 wherein the one or more variables is selected from the group consisting of: tree loss attenuation, building loss attenuation, cable loss, connector loss, filter loss, antenna noise temperature, ambient noise temperature, LNA gain, LNA noise figure, and GPS satellite transmit power.

4. The computer-readable medium of claim 1 wherein the one or more variables is associated with a satellite receiving unit operating environment.

5. The computer-readable medium of claim 4 wherein the satellite receiving unit operating environment is selected from the group consisting of: an open sky environment, a rural environment, a suburban environment, and an urban environment.

6. The computer-readable medium of claim 1 wherein the predetermined number of values is at least ten thousand values.

7. The computer-readable medium of claim 1 wherein the instructions for implementing an evaluation module include instructions for outputting at least one of:
   (a) a histogram representing a distribution of a number of tracked satellites for a satellite receiving unit operating environment; and
   (b) a graphical representation of the satellite service performance along one or more drive routes.

8. The computer-readable medium of claim 7 wherein the simulator randomly generates the one or more drive routes.

9. In a computer system for evaluating performance of a satellite service, a method for predicting satellite coverage comprising:
   generating a predetermined number of values for one or more variables corresponding to a satellite coverage link budget, the predetermined number of values generated for each one of a plurality of satellites in one or more satellite constellations available for a satellite receiving unit for a predetermined time period, wherein the predetermined time period is less than or equal to two hours;
   storing a satellite antenna radiation pattern comprising a digitized representation of satellite antenna gain associated with the satellite receiving unit; and
   evaluating the satellite coverage link budget via a Monte Carlo technique based on each one of the predetermined number of values and the stored satellite antenna radiation pattern.

10. The method of claim 9 wherein the satellite service is a GPS service.

11. The method of claim 9 wherein the one or more variables is selected from the group consisting of: tree loss attenuation, building loss attenuation, cable loss, connector loss, filter loss, antenna noise temperature, ambient noise temperature, LNA gain, LNA noise figure, and GPS satellite transmit power.

12. The method of claim 9 wherein the one or more variables is associated with a satellite receiving unit operating environment.

13. The method of claim 12 wherein the satellite receiving unit operating environment is selected from the group consisting of: an open sky environment, a rural environment, a suburban environment, and an urban environment.

14. The method of claim 9 wherein the predetermined number of values is at least ten thousand values.

15. The method of claim 6 wherein the evaluation step further comprises outputting at least one of:
   (a) a histogram representing a distribution of a number of tracked satellites for a satellite receiving unit operating environment; and
   (b) a graphical representation of the satellite service performance along one or more drive routes.

16. The method of claim 15 further comprising randomly generating the one or more drive routes.

17. A non-transitory computer-readable medium having stored thereon computer executable instructions to cause the computer to execute a method for predicting satellite coverage, the instructions comprising:
   instructions for generating a predetermined number of values for one or more variables corresponding to a satellite coverage link budget, the predetermined number of values generated for each one of a plurality of satellites in one or more satellite constellations available for a satellite receiving unit for a predetermined time period, wherein the predetermined time period is less than or equal to two hours;

instructions for storing a satellite antenna radiation pattern comprising a digitized representation of satellite antenna gain associated with the satellite receiving unit; and instructions for evaluating the satellite coverage link budget via a Monte Carlo technique based on each one of the predetermined number of values and the stored satellite antenna radiation pattern.

18. The computer-readable medium of claim 17 wherein the one or more variables is selected from the group consisting of: tree loss attenuation, building loss attenuation, cable loss, connector loss, filter loss, antenna noise temperature, ambient noise temperature, LNA gain, LNA noise figure, and GPS satellite transmit power.

* * * * *